United States Patent [19]
Nagano

[11] Patent Number: 5,293,965
[45] Date of Patent: Mar. 15, 1994

[54] BICYCLE BRAKE
[75] Inventor: Masashi Nagano, Izumi, Japan
[73] Assignee: Shimano Inc., Osaka, Japan
[21] Appl. No.: 933,731
[22] Filed: Aug. 24, 1992
[30] Foreign Application Priority Data
Aug. 28, 1991 [JP] Japan .................................. 3-215738
[51] Int. Cl.⁵ .................................................. B62L 1/14
[52] U.S. Cl. ................................. 188/24.21; 188/2 D
[58] Field of Search ................. 188/2 D, 24.12, 24.19, 188/24.21, 24.22

[56] References Cited
U.S. PATENT DOCUMENTS

| 2,160,181 | 5/1939 | Taylor | 188/24.21 X |
| 3,957,138 | 5/1976 | Kine | 188/2 D X |
| 4,027,746 | 6/1977 | Kine | 188/24.21 X |

FOREIGN PATENT DOCUMENTS

| 469576 | 2/1992 | European Pat. Off. |
| 3720115A1 | 12/1987 | Fed. Rep. of Germany |
| 52-36455 | 9/1950 | Japan |
| 62-187990 | 11/1987 | Japan |
| 3-64193 | 6/1991 | Japan |
| 1561137 | 2/1980 | United Kingdom |

Primary Examiner—Matthew C. Graham
Attorney, Agent, or Firm—Dickstein Shapiro & Morin

[57] ABSTRACT

A bicycle brake mechanism includes a brake operating lever, a first and a second brake calipers pivotably supported on a bicycle frame, a control cable having one end thereof connected to the brake operating lever, and the other end connected to the first brake caliper, a connecting element for engaging the control cable to be movable along the control cable, a tension element for interconnecting the second brake caliper and the connecting element, and a supporter disposed between the connecting element and the first brake caliper for maintaining a predetermined distance between the connecting element and a point at which the first brake caliper engages the control cable.

8 Claims, 2 Drawing Sheets

BICYCLE BRAKE

BACKGROUND OF THE INVENTION

1. Field of the Invention

The present invention relates to bicycle brakes, and more particularly to the construction of a center-pull type caliper brake.

2. Description of the Related Art

In a conventional construction of a center-pull type caliper brake, as disclosed in Japanese Utility Model Publication Kokai No. 1991-64193, for example, a pair of brake calipers having brake shoes are pivotably supported independently of each other by a bicycle frame. In this example, one end of a yoke cable is connected to one of the brake calipers, while the other end of the cable is connected to the other brake caliper. Further, this yoke cable, at or adjacent a middle position thereof, is relatively movably engaged through a connecting element with a control cable connected to a brake lever.

According to this construction, the connecting element must be in a middle position transversely of a bicycle in order for the pair of brake shoes to take braking action simultaneously. If the connecting element is even slightly displaced from the middle position of the yoke cable, the two brake shoes do not contact a wheel rim simultaneously. In this case, one of the brake shoes applies a greater braking force than the other. Thus, this prior construction leaves room for improvement.

A development of the above construction is disclosed in Japanese Utility Model Publication Kokai No. 1987-187990. In this example, a control cable extends from a brake lever to one of brake calipers, and a connecting element is provided to be slidable along the control cable. The other brake caliper is connected to the connecting element through a connecting cable. This construction is capable of equalizing a distance from the connecting element to one of the calipers and a distance from the connecting element to the other caliper with ease.

According to this construction, however, the control cable is curved in the region of the connecting element to extend toward one of the calipers. Thus, a tension acts toward one of the calipers, thereby tending to move the connecting element in that direction. As a result, right and left braking forces are not applied simultaneously, impairing an optimal braking result.

SUMMARY OF THE INVENTION

An object of the present invention is to provide a center-pull type caliper brake which checks displacement of the connecting element from a transversely middle position of a bicycle, thereby allowing right and left brake shoes to contact a wheel rim simultaneously with greater assurance.

The above object is fulfilled, according to the present invention, by a bicycle brake mechanism comprising a brake operating lever, a first and a second brake calipers pivotably supported on a bicycle frame, a control cable having one end thereof connected to the brake operating lever, and the other end connected to the first brake caliper, a connecting element for engaging the control cable to be movable along the control cable, a tension element for interconnecting the second brake caliper and the connecting element, and a supporter disposed between the connecting element and the first brake caliper for maintaining a predetermined distance between the connecting element and a point at which the first brake caliper engages the control cable.

According to the above construction, the supporter maintains the connecting element on a centerline transversely of the bicycle despite a transversely unequal tension applied by the control cable. This facilitates a simultaneous operation of right and left brake shoes.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

An embodiment of the present invention will be described hereinafter with reference to the drawings.

Figure 1:
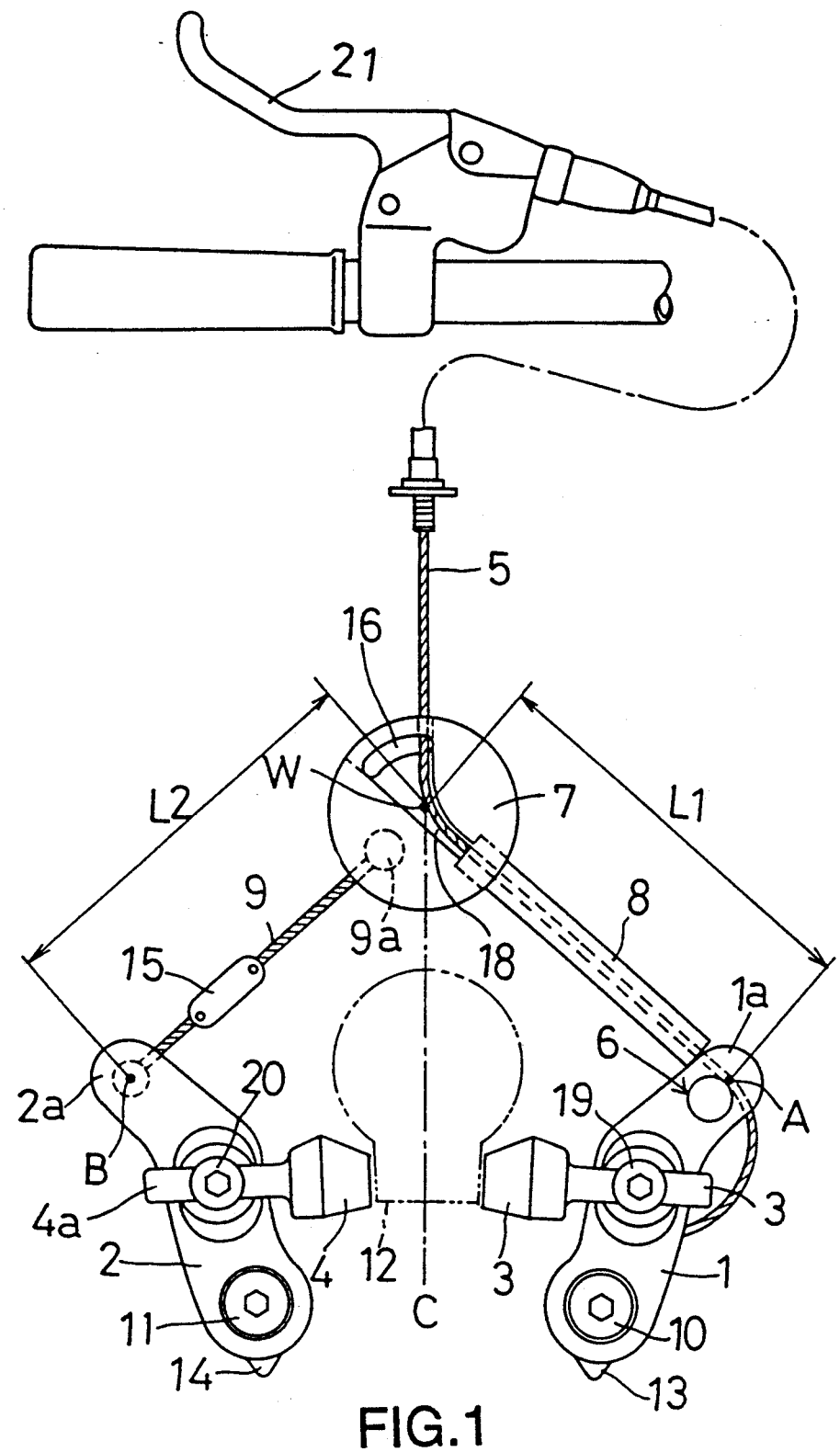
FIG. 1 is a view showing principal portions of a bicycle including a center-pull type caliper brake and a brake lever.

FIG. 1 is a view showing principal portions of a bicycle including a center-pull type caliper brake and a brake lever. A pair of brake calipers 1 and 2 are pivotably attached to a bicycle frame (not shown) through mounting screws 10 and 11, respectively. The brake calipers 1 and 2 have brake shoes 3 and 4 attached to intermediate positions thereof, respectively. The brake caliper 1 includes a control portion 1a formed at the end thereof remote from the mounting screw 10, to which a control cable 5 is connected. The corresponding end of the brake caliper 2 forms a control portion 2a for engaging a connecting cable 9. The control cable 5 is connected to the control portion 1a of the caliper 1 through a substantially circular connecting element 7 and a restrictor 8. The connecting cable 9 interconnects the control portion 2a of the caliper 2 and the connecting element 7. The control cable 5 is operable by a brake lever 21.

When the brake lever 21 is gripped, the control cable 5 is pulled, and the resulting tension is divided by the connecting element 7 for transmission to the control portions 1a and 2a of the brake calipers 1 and 2. As a result, the calipers 1 and 2 pivot about the mounting screws 10 and 11, whereby the brake shoes 3 and 4 contact and apply frictional forces to a wheel rim 12 of the bicycle. The brake calipers 1 and 2 are biased in brake releasing directions by return springs (not shown) mounted in cases 13 and 14. Thus, when the rider releases the brake lever 21, the braking forces are canceled by the biasing forces of these springs.

This brake mechanism will be described in greater detail below.

Figure 3:
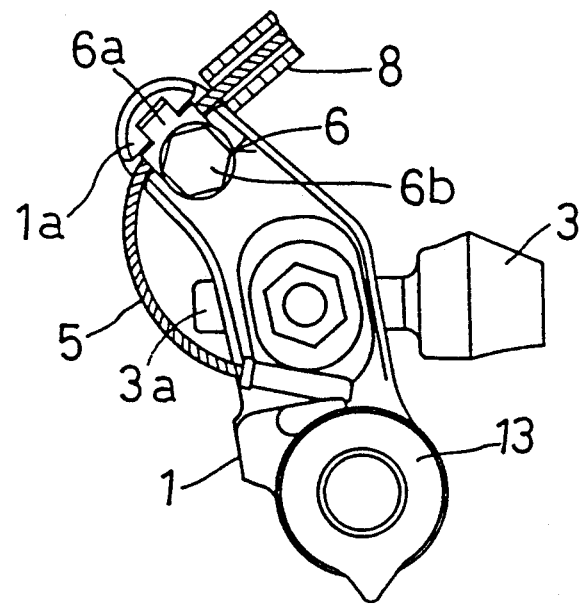
FIG. 3 is a view seen opposite to FIG. 1 and showing a region of a brake caliper.

The control portion 1a of the brake caliper 1 includes a cable clamp 6 for fastening the control cable 5 to the control portion 1a. As shown in FIG. 3, the cable clamp 6 secures the control cable 5 to the control portion 1a by means of a clamp screw 6b which holds the cable 5 between a cable holder 6a and the control portion 1a.

The connecting cable 9 having a specification indicator 15 is attached at one end 9a thereof to the connecting element 7, and at the other end (not referenced) to the control portion 2a of the brake caliper 2.

Figure 2:
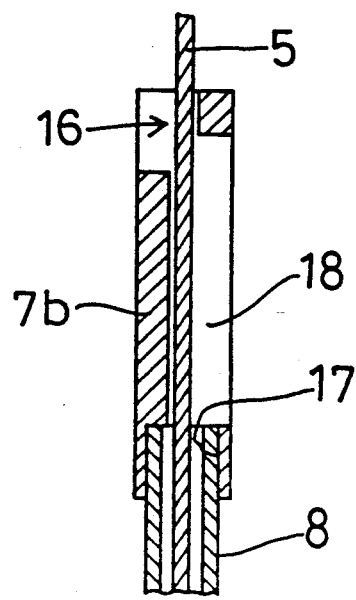
FIG. 2 is a sectional view taken along a restrictor of a connecting element.

As shown in FIG. 1, the connecting element 7 is substantially disk-shaped in plan view. The control cable 5 enters the connecting element 7 through a cable receiving bore 16 having an arcuate shape extending in a circumferential direction of the connecting element 7. The control cable 5 then extends through a guide groove 18 formed in a front surface of the connecting element 7 which lies on the right side in FIG. 2, and to the brake caliper 1 through the restrictor 8 attached to a restrictor mounting bore 17 of the connecting element 7. The guide groove 18 is formed to extend substantially through the center of the connecting element 7. Thus, the connecting element 7 is freely slidable along the control cable 5.

As shown in FIG. 1, the restrictor 8 has a tubular construction for slidable penetration by the control cable 5. One end of the restrictor 8 is attached to the mounting bore 17 of the connecting element 7, and the other end thereof is in contact with the control portion 1a of the brake caliper 1. The purpose of providing this restrictor 8 is as follows.

The control cable 5 extends toward the brake caliper 1 along a curved surface of the guide groove 18 formed in the connecting element 7. Consequently, the tension applied from the control cable 5 to the connecting element 7 includes a component acting rightward in FIG. 1. The restrictor 8 provides the connecting element 7 with a support counteracting the rightward component, thereby maintaining the connecting element 7 on a centerline (C) transversely of the bicycle. A point W in FIG. 1 marks an intersection of the control cable 5 and a straight line (not shown) extended along the connecting cable 9 toward the connecting element 7. Reference L2 denotes a distance between this point W and a point B at which the connecting cable 9 is connected to the control portion 2a. Similarly, reference L1 denotes a distance between the point W and a point A at which the control cable 5 engages the control portion 1a. The primary object of the restrictor 8 is to maintain the distances L1 and L2 substantially the same and retain the connecting element 7 on the centerline (C).

On the other hand, the brake shoes 3 and 4 are positionally adjustable relative to the brake calipers 1 and 2 by loosening mounting elements 19 and 20 relative to support portions 3a and 4a and sliding the support portions 3a and 4a. Specifically, the brake lever 21 is gripped to operate the brake, and in this state the brake shoes 3 and 4 are adjusted relative to the brake calipers 1 and 2 to locate the point W on the centerline C transversely of the bicycle. In this way, adjustment may be made to cause the two brake calipers 1 and 2 to apply braking forces to the wheel rim 12 simultaneously.

As a different embodiment, the connecting cable 9 may be replaced by a rod. Rollers or other means for lowering coefficient of friction may be provided where the connecting element 7 engages the control cable 5, i.e. the surface of the guide groove 18 on which the control cable 5 slides. A hook or ring may be used as the connecting element 7. In other words, this element may comprise any kind that is slidable relative to the control cable 5.

The restrictor 8, instead of being tubular to allow the control cable 5 to pass therethrough, may have a straight or curved slit formed in a side and extending through an entire length thereof for receiving the control cable 5. Then the restrictor 8 is attachable and detachable even after the control cable 5 is secured to the brake caliper 1. Further, the restrictor 8 may be in some other form for transmitting support from the brake caliper 1 to the connecting element 7, such as a bar-like member lying between the connecting element 7 and brake caliper 1 and extending parallel to the control cable 5.

What is claimed is:

1. A bicycle brake mechanism comprising:
   a brake operating lever;
   a first and a second brake caliper pivotably supported on a bicycle frame;
   cable connecting means provided on said first brake caliper;
   a control cable having one end thereof connected to said brake operating lever, and the other end connected to said first brake caliper at said cable connecting means;
   a connecting element engageable with and slidable along said control cable;
   a tension element for interconnecting said second brake caliper and said connecting element; and,
   a supporter disposed between said connecting element and said first brake caliper for maintaining a predetermined distance between said connecting element and a point at which said first brake caliper engages said control cable, said supporter including a hollow portion through which said control cable extends, said supporter maintaining said predetermined distance by contacting said first brake arm and engaging said conducting element and by counteracting a tension force exerted by said control cable.

2. A bicycle brake mechanism as claimed in claim 1, wherein said tension element is a cable.

3. A bicycle brake mechanism as claimed in claim 1, wherein said supporter comprises a tubular member through which said control cable extends, said tubular member having one end thereof contacting said first brake caliper, and the other end engaged with said connecting element, thereby maintaining said predetermined distance.

4. A bicycle brake mechanism as claimed in claim 3, wherein said connecting element includes a recess for receiving said tubular member.

5. A bicycle brake mechanism as claimed in claim 4, wherein said connecting element is substantially disk-shaped, and defines a guide groove for allowing said control cable to extend substantially centrally of said connecting element, said guide groove having one end extending to said recess.

6. A bicycle brake mechanism as claimed in claim 1, wherein said predetermined distance substantially corresponds to a distance from a point at which said second brake caliper engages said tension element to said connecting element.

7. A bicycle brake mechanism as claimed in claim 1, wherein said tension element comprises a bar-like member.

8. A bicycle brake mechanism as claimed in claim 1, wherein said supporter non-fixedly contacts said first brake arm.

* * * * *